Sept. 19, 1950     J. A. J. BENNETT     2,523,186
ROTARY WING AIRCRAFT
Filed Dec. 20, 1946     4 Sheets-Sheet 1
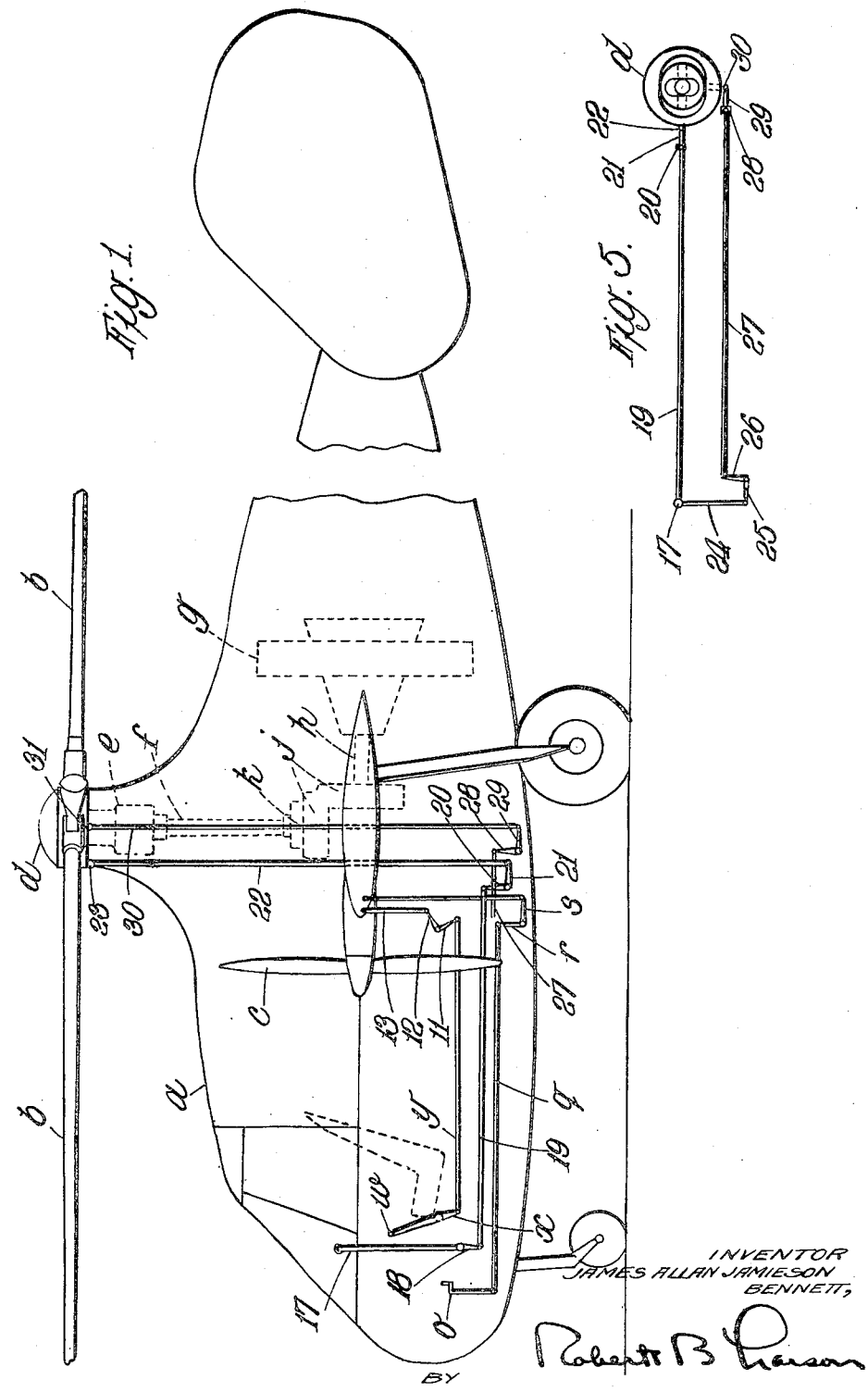
INVENTOR
JAMES ALLAN JAMIESON BENNETT,
BY Robert B Pearson
ATTORNEY

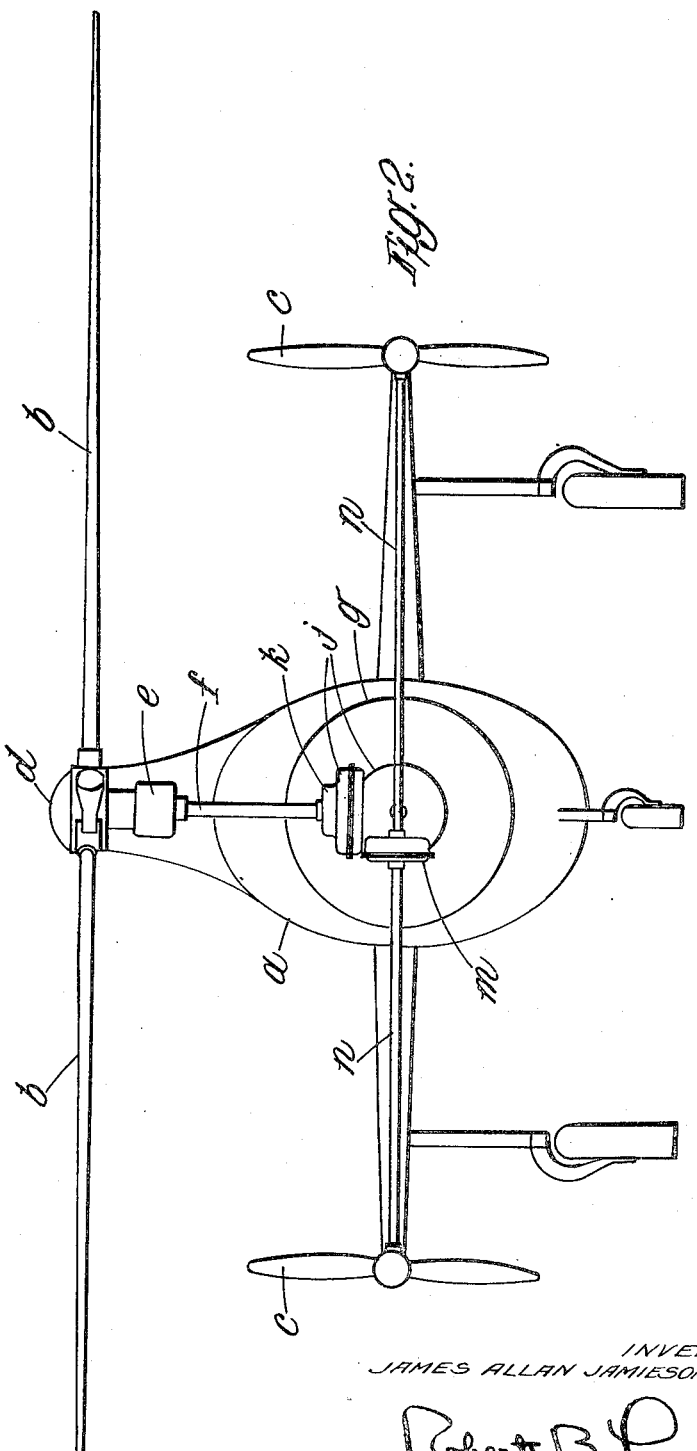

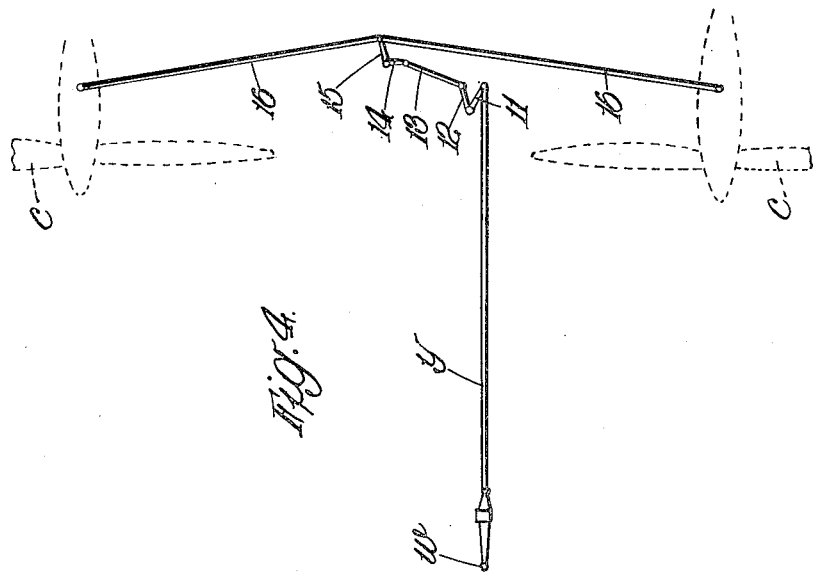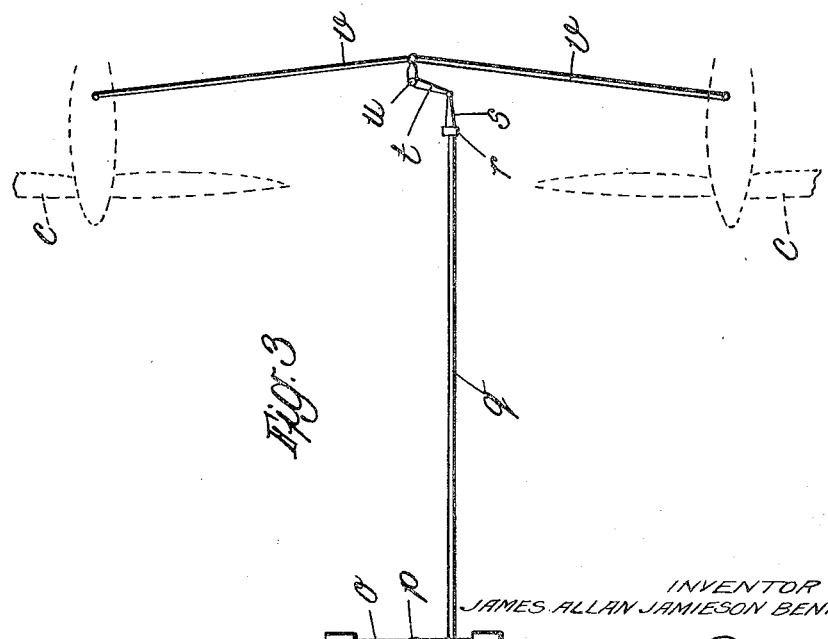

Sept. 19, 1950      J. A. J. BENNETT      2,523,186
ROTARY WING AIRCRAFT
Filed Dec. 20, 1946      4 Sheets-Sheet 4
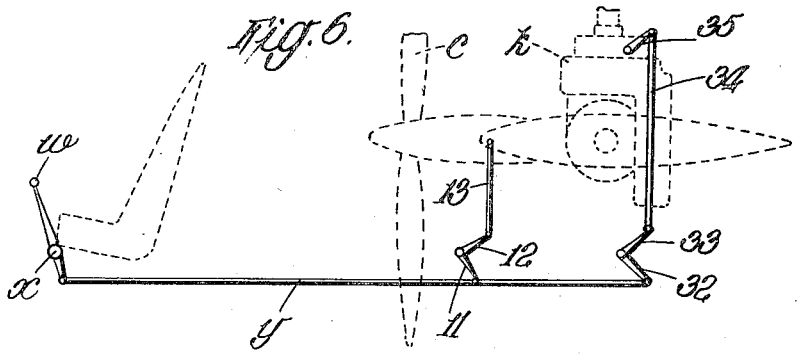
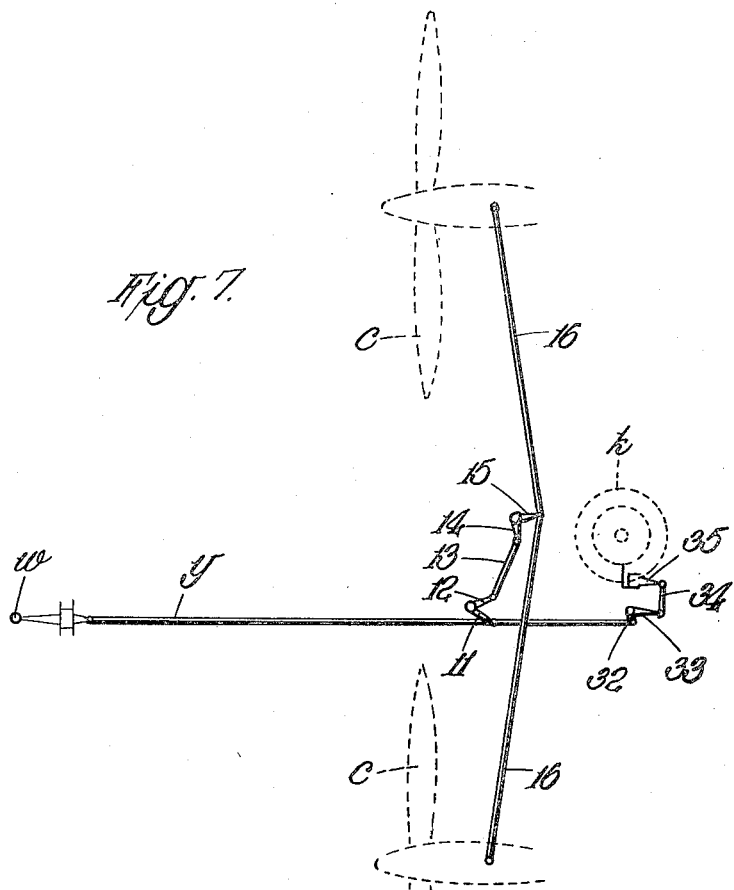
INVENTOR
JAMES ALLAN JAMIESON BENNETT,
BY Robert B Larson
ATTORNEY Patented Sept. 19, 1950

2,523,186

UNITED STATES PATENT OFFICE 2,523,186

ROTARY WING AIRCRAFT

James Allan Jamieson Bennett, Round Riding Road, Scotland

Application December 20, 1946, Serial No. 717,468
In Great Britain June 27, 1946

3 Claims. (Cl. 170—135.23)

1

This invention relates to rotary wing aircraft having a single main rotor for sustentation and twin outboard propellers for propulsion, and particularly to helicopters in which the rotor pitch is always within the autorotative range and in which the distribution of power between the main rotor and the outboard propellers is variable in flight.

An object of the invention is to provide a rotary wing aircraft which combines the slow take-off and landing feature of the conventional helicopter with the advantages of low-pitch operation in translational flight.

A further object of the invention is to provide an improved arrangement for counterbalancing torque reaction in a gyrodyne, i. e. a rotary wing aircraft in which part of the power is applied to the rotor and part to a forward propeller.

A still further object is to provide a control system for maintaining trim and/or control of the aircraft in yaw whilst the distribution of power between the rotor and the propellers is varied in flight.

In a rotary wing aircraft according to the present invention, having a single main rotor and twin outboard propellers, the rotor torque is counterbalanced by a moment resulting from the differential thrust of the two propellers, which are provided with means to adjust their pitch in the same sense, i. e. collectively, thereby varying the power distribution between the rotor and the propellers, together with means to adjust their pitch in the opposite sense, i. e. differentially, thereby enabling the aircraft to be controlled and/or trimmed in yaw.

Preferably the collective pitch of the rotor varies, or is varied, automatically with variation in rotor power, but, as forward propulsion of the aircraft is obtained independently of rotor inclination to the flight path, it is unnecessary for the blade angle to be increased beyond the autorotative range to compensate for an increase in axial flow with forward speed.

Pitching and rolling control of the aircraft may be provided by adjusting the inclination of the rotor tip-path plane with respect to the hub axis. Preferably, foot control means operable by the pilot are provided for adjusting the pitch of the propellers differentially for control of the aircraft in yaw.

The outboard propellers may be geared permanently to the engine. Consequently, should the engine stop under any condition of flight, the propellers also stop, but, a free-wheeling clutch being provided in the rotor transmission

2 and the blades being at autorotative pitch, the rotor continues to rotate, as in the rotaplane.

A hand-lever may be provided for adjusting the pitch of the propellers collectively. An increase in collective pitch of the propellers for a given engine speed increases the proportion of power absorbed by the propellers and, therefore, decreases the proportion of power available for the rotor. Consequently, rotor torque decreases progressively as the collective pitch of the propellers is increased, and less differential pitch is required for yawing trim. When the collective pitch of the propellers is increased to absorb all the available power for a given engine speed, the rotor power (and therefore torque) becomes zero and the propellers have equal pitch and thrust if they are identical and symmetrically located on each side of the fuselage. The rotor is then in autorotation until the collective pitch of the propellers is decreased or the total power available is increased.

An aircraft embodying the present invention is therefore a novel rotary wing type, being convertible in flight progressively from helicopter to rotaplane operation and vice versa.

In some cases the hand lever for adjusting the pitch of the propellers collectively may be connected also with the rotor clutch so that the rotor drive may be declutched when the collective pitch of the propellers has been increased to a predetermined extent.

In the accompanying drawings:

Figures 1 and 2 are diagrammatic side and front views, respectively, of one form of rotary wing aircraft constructed in accordance with the invention.

Figure 3 is a diagrammatic plan of differential pitch change control means for the outboard propellers.

Figure 4 is a diagrammatic plan of collective pitch change control means for the outboard propellers.

Figure 5 is a diagrammatic plan of control means for the rotor head, and

Figures 6 and 7 are diagrammatic side and plan views, respectively, of collective pitch change control means for the outboard propellers interconnected with rotor drive clutch control means.

As shown in Figures 1 to 5 an aircraft $a$ has a single main rotor $b$ for sustentation and twin outboard propellers $c, c$ for propulsion, these propellers being provided with pitch change mechanism of known type and not shown. $d$ is the rotor head and $e$ the rotor hub which is driven by a shaft $f$ from an engine $g$ through an engine shaft $h$, bevel gear the casing of which is shown at $j$ and a uni-directional clutch mechanism shown generally at $k$.

The propellers $c$, $c$ are driven from the engine $g$ through gearing meshing with that in the casing $j$ and contained in a casing $m$ and through transverse shafts $n$ $n$ and bevel gear (not shown).

Differential pitch change control of the propellers $c$, $c$ is effected by means of a pedal $o$, Figures 1 and 3, which is connected, at one side of its pivotal axis $p$ by a link $q$ with one arm $r$ of a bell crank lever $r$, $s$, movable about a transverse axis, and the other arm $s$ of which is connected with one arm $t$ of a bell crank lever $t$, $u$, movable about a fore and aft axis, and the other arm $u$ of which is attached to two upwardly and outwardly extending links $v$, $v$ connected with the pitch change mechanisms (not shown) of the propellers $c$, $c$, hence rotary movement of the pedal $o$ in either direction will produce movement of the links $v$, $v$ in opposite directions and vary the pitch of the propellers $c$, $c$ differentially.

Collective pitch change control of the propellers $c$, $c$ is effected by means of a lever $w$, Figures 1 and 4, which is pivoted at $x$ and connected by a link $y$ with one arm 11 of a bell crank lever 11, 12, movable on an inclined transverse axis, and the other arm 12 of which is connected by a link 13 with one arm 14 of a bell crank lever 14, 15 movable about a vertical axis, and the other arm 15 of which is attached to upwardly and outwardly extending links 16, 16 connected with the pitch change mechanisms of the propellers $c$, $c$, hence movement of the lever $w$ in the fore and aft direction will produce movement of both the links 16, 16 in the one direction or the other and vary the pitch of the propellers $c$, $c$ collectively.

Control of the rotor head $d$ to tilt the rotor $b$ is effected by means of a lever 17, Figures 1 and 5, pivoted universally at 18 and connected, on the one hand, by a link 19 with one arm 20 of a bell crank lever 20, 21, movable about a transverse axis, and the other arm 21 of which is connected by a link 22 with the front of the rotor head $d$ at 23, Figure 1, while, on the other hand, the lever 17 is connected by a laterally extending link 24, Figure 5, with one arm 25 of a bell crank lever 25, 26, movable about a vertical axis, and the other arm 26 of which is connected by a link 27 with one arm 28 of a bell crank lever 28, 29, movable about a horizontal transverse axis, and the other arm 29 of which is connected by a link 30 with one side of the rotor head $d$ at 31, Figure 1. Hence movement of the lever 17 in the fore and aft direction tilts the rotor $b$ in the same direction, movement of the lever 17 transversely tilts the rotor $b$ transversely and compound movement of the lever tilts the rotor $b$ correspondingly.

In the arrangement illustrated diagrammatically by Figures 6 and 7 the parts of the collective pitch change control means for the propellers $c$, $c$ are indicated by the same references as in Figure 4. In addition the link $y$ is extended beyond the bell crank lever 11, 12 and is connected with one arm 32 of a bell crank lever 32, 33, movable about a horizontal transverse axis, and the other arm 33 of which is connected by a link 34 with a clutch operating lever 35 for the uni-directional clutch mechanism $k$. Hence when the lever $w$ is moved in the fore and aft direction the clutch $k$ may be operated to declutch the rotor drive when the collective pitch of the propellers $c$, $c$ has been increased to a predetermined extent or to clutch in said drive when the collective pitch of the propellers $c$, $c$ is below the predetermined value.

I claim:

1. In a rotary wing aircraft, a single main rotor tiltable about axis perpendicular to its axis of rotation, a pair of outboard propellers adjustable in pitch and mounted one on each side of the axis of the rotor, a single power source drivably connected to said rotor and to said propellers, means in the connection between said rotor and said power source for disconnecting said rotor from said power source, and a control arrangement comprising means to tilt the rotor to adjust the inclination of the rotor tip path plane to control pitching and rolling of the aircraft, means for adjusting the pitch of the propellers differentially for control of the aircraft in yaw, and means for adjusting the pitch of the propellers collectively to vary distribution of the power of said power source between said rotor and said propellers to vary the rate of forward propulsion, the rotor power being variable while maintaining level flight between one extreme of zero power under which condition the rotor is driven by autorotation and the tip path plane is at a positive angle of incidence to the flight path, through an intermediate condition in which both the rotor and the propellers contribute to forward propulsion, to the other extreme of maximum power when the collective pitch of the propellers is reduced to zero thrust and the aircraft operates as a helicopter with the tip path plane at a negative angle of incidence to the flight path.

2. The arrangement set forth in claim 1, in which said disconnecting means comprises a uni-directional clutch in the connection between said power source and said rotor, whereby said rotor becomes autorotative when said propellers have a pitch setting at which they absorb the total power available at said source.

3. The arrangement set forth in claim 2, and a connection between said clutch and said means for controlling the pitch of the propellers collectively, permitting automatic declutching of the rotor when the collective pitch of the propellers has been increased to a predetermined extent.

JAMES ALLAN JAMIESON BENNETT.

REFERENCES CITED

The following references are of record in the file of this patent:

UNITED STATES PATENTS

| Number | Name | Date |
| --- | --- | --- |
| 1,993,701 | Avery | Mar. 5, 1935 |
| 2,095,556 | Mills | Oct. 12, 1937 |
| 2,241,503 | Campbell | May 13, 1941 |
| 2,317,340 | Bennett | Apr. 27, 1943 |
| 2,380,583 | De la Cierva | July 31, 1945 |